Sept. 29, 1936.   F. SCHUBERT   2,056,021
ELECTRICAL CONTROL FOR GAS WATER HEATERS
Filed June 12, 1935
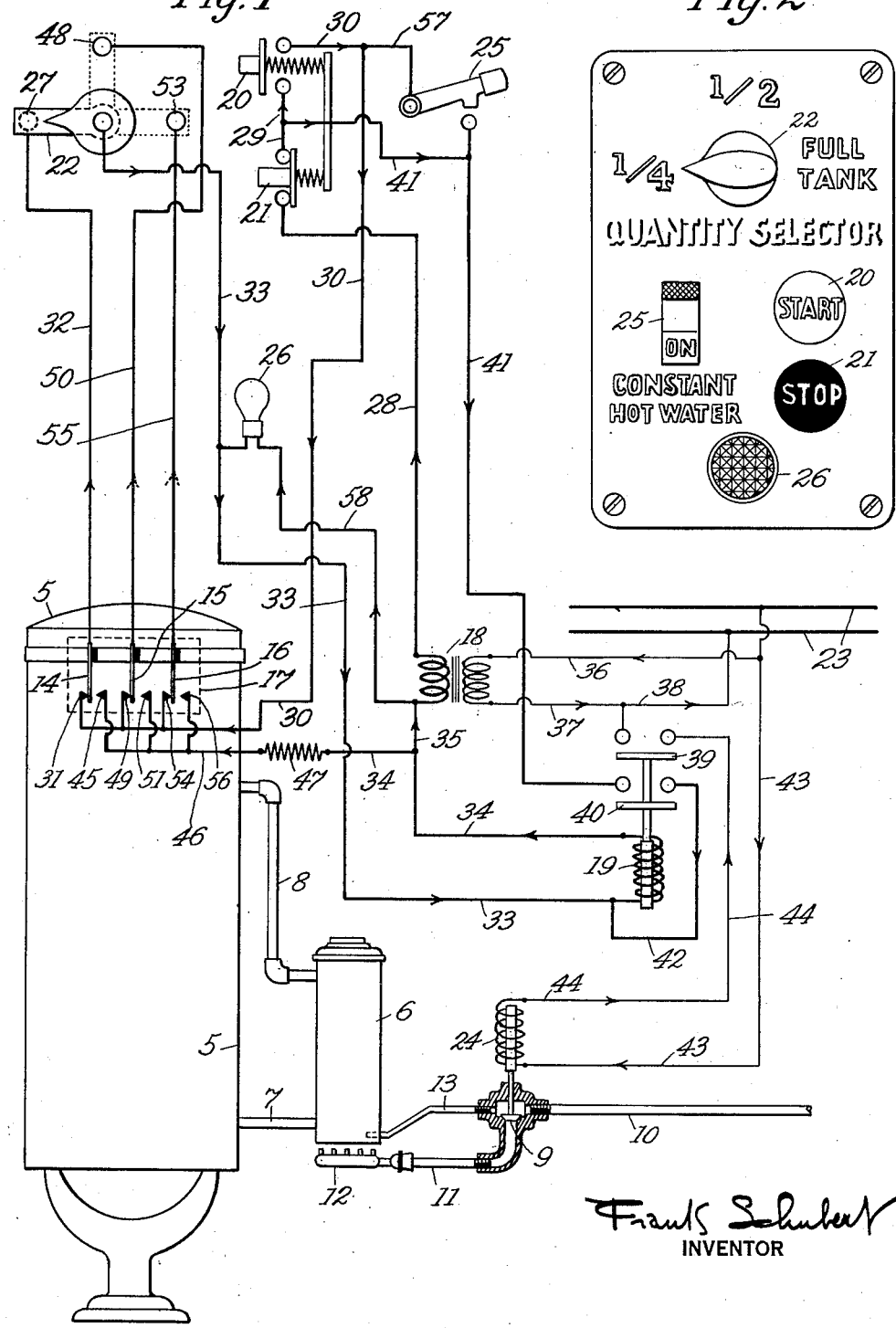
Frank Schubert
INVENTOR Patented Sept. 29, 1936

2,056,021

UNITED STATES PATENT OFFICE 2,056,021

ELECTRICAL CONTROL FOR GAS WATER HEATERS

Frank Schubert, Lynbrook, N. Y.

Application June 12, 1935, Serial No. 26,237

6 Claims. (Cl. 236—20)

This invention relates to electrical controls for gas water heaters, its main object being to provide means for manually selecting different quantities of the water in a boiler and to automatically heat these quantities to a given minimum temperature. Another object is to provide a control whereby, after a certain quantity of water has been heated to a given temperature, the gas heater will shut off automatically and remain so or if desired will restart automatically as the water cools off and thereby constantly maintain a selected amount of hot water. Still another object is to so devise the control as to make its installation readily applicable to the standard form of gas water heater and storage tank or boiler.

To accomplish the object of automatically heating several different quantities of water, advantage is taken of the fact that the larger the quantity of the water in a boiler heated to a given minimum temperature, the higher is the temperature of the water at the top of the boiler where the heating commences. I have, therefore, placed a number of thermostats in a common container near the top of the boiler and subject to the change in temperature of the water in the boiler, each thermostat being set to operate at a different temperature. Now when it is desired to procure a certain quantity of water heated to a certain minimum temperature a selector switch is set to pick out that particular thermostat which is set for the temperature which will have been reached at the top of the boiler when the limiting lower level of that certain quantity of water in the boiler has attained the given minimum temperature. The thermostat in turn is so connected in an electrical circuit as to cause an electrically operated gas valve which controls the flow of gas to the heater, to be shut off at the temperature to which the same has been set.

In order to start a heater equipped with my improved control mechanism it is merely necessary to momentarily press a starting button provided for this purpose, whereupon the gas is automatically admitted to the burner, being ignited by the conventional pilot flame, and eventually is shut off by the controlling thermostat selected through the quantity selector switch.

If, however, it is desired to stop the heater at any time after it has been started or set in operation, but before the automatic shut-down occurs, it is merely necessary to momentarily press a stop button provided for the purpose. In order to indicate whether the heater is in operation, an electric lamp is provided and so connected in the circuit as to remain lighted only while the gas valve is open.

I have arranged the quantity selector switch, the start and stop button, the switch for constant hot water operation and the indicating lamp in a common container, with the various controls operable through a labeled panel. This control unit can be placed in any convenient location and, if desired, additional start and stop button units can be placed about the premises and wired to supplement the main control buttons.

In the electrical circuit I have utilized low-voltage current wherever possible. The control switches, the thermostats and a relay are all operated on low-voltage current, obtained by means of a transformer, thus permitting the use of ordinary bell wire and easy installation. The relay mentioned above carries a set of contacts for controlling the electrically operated gas valve which operates directly from the high-voltage house circuit. If desired, the entire control can be installed so as to receive its electrical power by attachment to any convenient electrical outlet on the premises.

In the accompanying drawing, Fig. 1 is an elevation of a gas water heater equipped with the improved control mechanism, showing the arrangement of the various parts and their electrical connection; and Fig. 2 is a front view of the control panel.

Referring to Fig. 1, the main parts of an electrically controlled gas water heater are a water tank 5, a gas heater 6 connected to the boiler by water pipes 7 and 8, and an electromagnetic gas valve 9 fed by a gas pipe 10 and through a pipe 11, supplying the burner 12 of the heater 6, a pilot flame in the heater being continuously fed by a direct pipe 13.

To affect the aimed-for quantity control at given minimum water temperature, I attach to the tank 5 a number of thermostats 14, 15, 16, one for every quantity selected, all mounted in a common container 17, this container being placed on or above the limiting level of the smallest quantity selected and so arranged as to be under the influence of the temperature of the water in the boiler at that common level.

Each of the said thermostats is set to open its "cold" contact and close its "hot" contact at that temperature which the water at the common level must reach to bring the lower level of the corresponding quantity to the given minimum temperature, this thermostat temperature, according to the height of the common level, being more or less in excess of the called-for water temperature for the smallest quantity selected and correspondingly higher for the larger quantities.

The controlling thermostats are connected in parallel in the circuit of a transformer 18 actuating the solenoid 19 of an electromagnetic switch or relay through a momentary contact switch 20 and a normally closed contact switch 21, and each thermostat is connected to one of the contacts of a selector switch 22. The transformer 18 is fed from a house circuit 23 which through contacts controlled by the solenoid 19 energizes the solenoid 24 of the electromagnetic valve 9. In parallel with the contact 20 is a make and break switch 25 and in parallel with the solenoid 19 is an electric lamp 26.

When the switch 22 is set at the first contact 27, for the smallest quantity selected, the current, upon pressing the contact 20, flows from the transformer 18 by wire 28 through the normally closed contact 21 and by wire 29 through the contact 20, then by wire 30 through the "cold" contact 31 of thermostat 14 and by wire 32 through selector switch 22, thence by wire 33 through relay coil 19 whence it returns to transformer 18 through wires 34 and 35, the transformer 18 being permanently energized from the house circuit 23 by wires 36, 37 and 38.

The energization of solenoid 19 closes the relay contacts 39 and 40 so that upon the release of switch 20 the circuit from switch 21 through solenoid 19 is completed by wires 41, 42, 34 and 35, and current from line 23 is supplied to the valve solenoid 24 through wires 43, 44, contact 39 and wire 38. The solenoid 24 thus remains energized and the gas valve 9 open until the current through solenoid 19, which now does not pass through thermostat 14, is discontinued by depressing the contact 21 or deflected from its course by the thermostat. The latter, upon reaching the temperature limit of the smallest quantity selected, opens the contact 31 and closes a contact 45 so that the solenoid 19 is short-circuited through a resistance 47 by wires 34, 46, 32, switch 22, and wire 33. The main current thus being deflected from solenoid 19 the action of the latter is weakened and the contacts 39 and 40 are reopened, thereby deenergizing solenoid 24 and reopening valve 9.

When the switch 22 is set at the second contact 48, the current from wire 30, upon pushing button 20, passes through contact 49 of thermostat 15 and by wire 50 through switch 22 to wire 33. Upon releasing the button, the current follows the same path as for the former setting of switch 22, but now thermostat 15, set for the second quantity selected, controls the circuit by closing at its limiting temperature a contact 51 which again short-circuits the solenoid 19 through the resistance 47.

When the selector switch 22 is set at the third contact 53, the current from wire 30, upon depressing contact 20 passes through contact 54 of thermostat 16 and by wire 55 and switch 22 to wire 33, and on releasing the contact, the current again flows as above, except that now the thermostat 16, set for the third quantity selected, controls the circuit by closing, at its temperature limit a contact 56, which as before short-circuits the solenoid 19 through resistance 47.

Thus, according to the setting of selector switch 22, either one of three different quantities, which in the present case are chosen as one-quarter, one-half and whole contents of the tank, as shown by the markings on the panel in Fig. 2, can be heated to a given temperature by this arrangement. By using a different number of thermostats, any other number of quantities may be obtained in the same manner.

When closing the switch 25 instead of button 20, the circuit from wire 28 to wire 30 is permanently instead of momentarily established by wires 41 and 57, hence when the relay contact 39 is broken by the heating of one of the thermostats 14, 15, or 16, according to the setting of selector switch 22, the circuit through coil 19 will be automatically re-established as soon as the temperature at the thermostat level in the boiler has fallen below the setting of the controlling thermostat, thus closing one of the "cold" contacts 31, 49 or 54, and the boiler will then supply continuous hot water at a lower or higher temperature depending on which of the contacts 27, 48 or 53 the switch 22 has been set.

While current flows through coil 19, the lamp 26 is lighted through wires 34, 35, 58 and 33, thus indicating on the switch panel when the heater is in operation.

In Fig. 2 is shown the appearance of the control panel on which the quantity selector 22, the starting button 20, stop button 21, continuous hot water switch 25 and indicator lamp 26 are mounted.

Having thus described my invention, I make the following claims:

1. In combination, a water storage tank, heating means therefor and a control circuit for said heating means, electrically controlled means for controlling the operation of said heating means, said means including a plurality of thermostatic switches associated with the tank, subject to control by the temperature of the water in the tank and operative at different temperatures of the liquid in the tank, a manually operable selector switch in the control circuit, a manually operated circuit closing switch in the circuit, the said thermostatic switches and selector switch being so connected in the control circuit that after the control circuit has been closed by the manually operated closing switch it will be opened by one of the thermostatic switches, when the water has reached the opening temperature selected by the selector switch.

2. In combination, a water storage tank, gas heating means therefor, a gas valve for said gas heating means and a control circuit for said gas valve, electrically controlled means for controlling the operation of said heating means, said means including a plurality of thermostatic switches associated with the tank, subject to control by the temperature of the water in the tank and operative at different temperatures of the liquid in the tank, a manually operable selector switch in the control circuit, a manually operated circuit closing switch in the circuit, the said thermostatic switches and selector switch being so connected in the control circuit that after the control circuit has been closed by the manually operated closing switch it will be opened by one of the thermostatic switches when the water has reached the opening temperature selected by the selector switch.

3. In combination, a water storage tank, heating means therefor and a control circuit for said heating means, electrically controlled means for controlling the operation of said heating means, said means including a plurality of thermostatic switches associated with the tank, and disposed at substantially the same level in said tank, subject to control by the temperature of the water in the tank and operative at different temperatures of the liquid in the tank, a manually operable selector switch in the control circuit, a manually operated circuit closing switch in the circuit, the said thermostatic switches and selector switch being so connected in the control circuit that after the control circuit has been closed by the manually operated closing switch it will be opened by one of the thermostatic switches when the water has reached the opening temperature selected by the selector switch.

4. In an electrically controlled gas water heater including a storage tank, the combination with the tank of a control circuit for a gas valve for the heater for controlling the flow of gas thereto, said circuit including a manually operated closing switch, a multi-contact selector switch and a plurality of thermostatic switches subject to the heat of the water in the tank and normally closed, but selectively operable to automatically open the circuit when the water reaches the opening temperature for the thermostatic switch included in the circuit by the selector switch, the gas valve being closed when the selected thermostatic switch opens.

5. In an electrically controlled gas water heater including a storage tank, the combination with the tank of a control circuit for a gas valve for the heater for controlling the flow of gas thereto, said circuit including a manually operated closing switch, a multi-contact selector switch, a relay, a resistance, and a plurality of normally closed thermostatic switches connected in parallel in the circuit containing the resistance, said selector switch being arranged to close the circuit through any selected thermostatic switch, whereby the thermostatic switch selected will short circuit the relay through the resistance and close the gas valve when the water in the tank reaches a predetermined temperature.

6. In an electrically controlled gas water heater including a storage tank, the combination with the storage tank of a control circuit for a gas valve governing the flow of gas to the heater, a plurality of thermostatic switches operative at different temperatures in the control circuit and mounted at a common level and subject to the heat of the water in the storage tank, a manually set, selective multi-contact switch in the control circuit, a burner starting manual switch in the circuit, the said thermostatic and multi-contact switches being so connected in the circuit that after the control circuit has been closed by the burner starting switch it will be opened by one of the thermostatic switches when the water has reached the opening temperature for that thermostatic switch selected by the multi-contact switch.

FRANK SCHUBERT.